United States Patent
Takada

(10) Patent No.: US 9,915,995 B2
(45) Date of Patent: Mar. 13, 2018

(54) IMAGE CAPTURING APPARATUS AND CONTROL METHOD FOR THE SAME

(71) Applicant: CANON KABUSHIKI KAISHA, Tokyo (JP)

(72) Inventor: Toshiyuki Takada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/820,213

(22) Filed: Aug. 6, 2015

(65) Prior Publication Data
US 2016/0044238 A1    Feb. 11, 2016

(30) Foreign Application Priority Data

Aug. 11, 2014   (JP) .................................. 2014-163938
Jul. 10, 2015   (JP) .................................. 2015-139109

(51) Int. Cl.
H04N 5/232   (2006.01)
G06F 1/32    (2006.01)

(52) U.S. Cl.
CPC ....... *G06F 1/3206* (2013.01); *H04N 5/23241* (2013.01)

(58) Field of Classification Search
CPC .......................... G06F 1/3206; H04N 5/23241
See application file for complete search history.

(56) References Cited

U.S. PATENT DOCUMENTS

| | | | | |
|---|---|---|---|---|
| 7,428,391 B2 * | 9/2008 | Kobayashi | ......... | G03G 15/5004 399/88 |
| 8,370,664 B2 * | 2/2013 | Yamaguchi | ........ | G03G 15/5004 712/25 |
| 8,831,666 B2 * | 9/2014 | Cherukuri | ............. | G06F 1/3287 370/318 |

(Continued)

FOREIGN PATENT DOCUMENTS

CN   1892470 A   1/2007
CN   101944753 A  1/2011

(Continued)

OTHER PUBLICATIONS

The above patent documents were cited in a Nov. 23, 2017 Chinese Office Action, which is enclosed with an English Translation, that issued in Chinese Patent Application No. 201510470558.0.

*Primary Examiner* — Padma Haliyur
(74) *Attorney, Agent, or Firm* — Cowan, Liebowitz & Latman, P.C.

(57) ABSTRACT

An image capturing apparatus comprises: an image capturing unit configured to generate image data; an adding unit configured to add additional information every predetermined amount of pixel data in the image data; a transmission unit configured to transmit image data by the amount of pixel data to which the additional information is added; an image processing unit configured to perform image processing on the image data; and a power control unit configured to control power supply when the transmission unit transmits the pixel data, based on the additional information, (Continued)

wherein the power control unit restricts the power supply to less than a predetermined power amount in a case where the additional information indicates a predetermined state, and performs power supply at the predetermined power amount in a case where the additional information does not indicate the predetermined state.

9 Claims, 16 Drawing Sheets

(56) References Cited

U.S. PATENT DOCUMENTS

| | | |
|---|---|---|
| 2010/0325458 A1 | 12/2010 | Yamaguchi |
| 2012/0120289 A1* | 5/2012 | Sugioka ................ G06T 1/0007 348/294 |
| 2012/0218364 A1* | 8/2012 | Cardoso .................... B41J 2/41 347/127 |
| 2013/0063607 A1* | 3/2013 | Shimotono ............ H04N 5/232 348/187 |
| 2013/0147979 A1* | 6/2013 | McMahon ............. H04N 5/335 348/218.1 |
| 2014/0139565 A1* | 5/2014 | Choi .................... G09G 3/2018 345/691 |
| 2014/0340377 A1* | 11/2014 | Kishi ................... G09G 3/3225 345/211 |
| 2014/0355062 A1* | 12/2014 | Sakai ..................... G06K 15/02 358/1.15 |

FOREIGN PATENT DOCUMENTS

| | | |
|---|---|---|
| CN | 101998042 A | 3/2011 |
| CN | 102014048 A | 4/2011 |
| CN | 202889529 U | 4/2013 |
| JP | 2007-166531 A | 6/2007 |
| JP | 2012-120158 A | 6/2012 |

* cited by examiner

FIG. 6A
| HEADER NAME | bit[1] | bit[0] |
|---|---|---|
| POWER CONTROL INFORMATION | IMAGE PROCESSING UNIT | TRANSMISSION LINE |
FIG. 6B
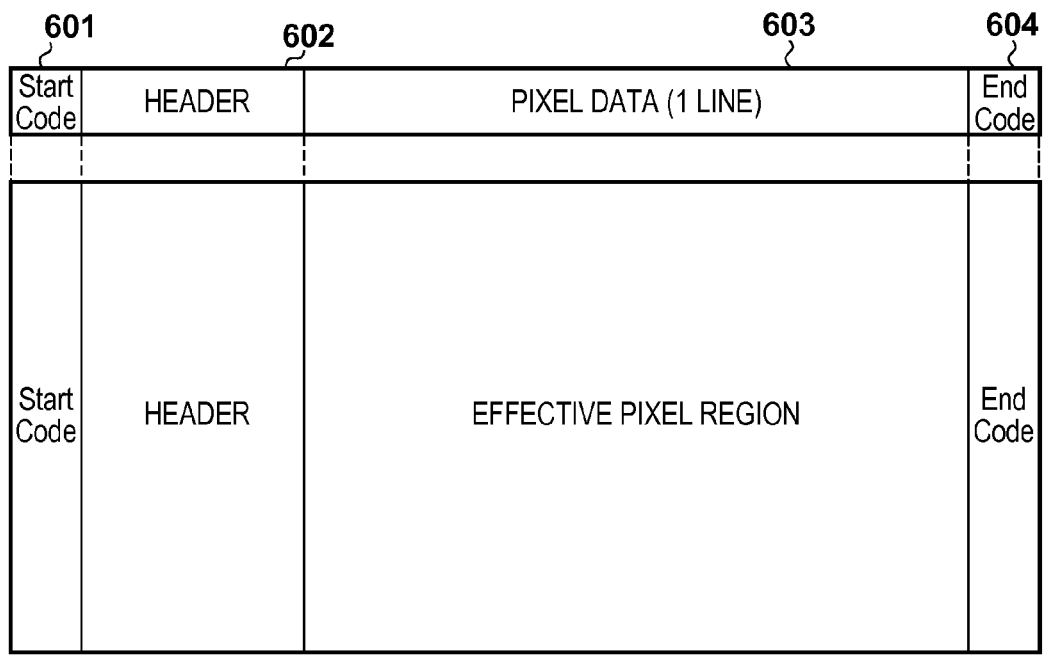
FIG. 6C
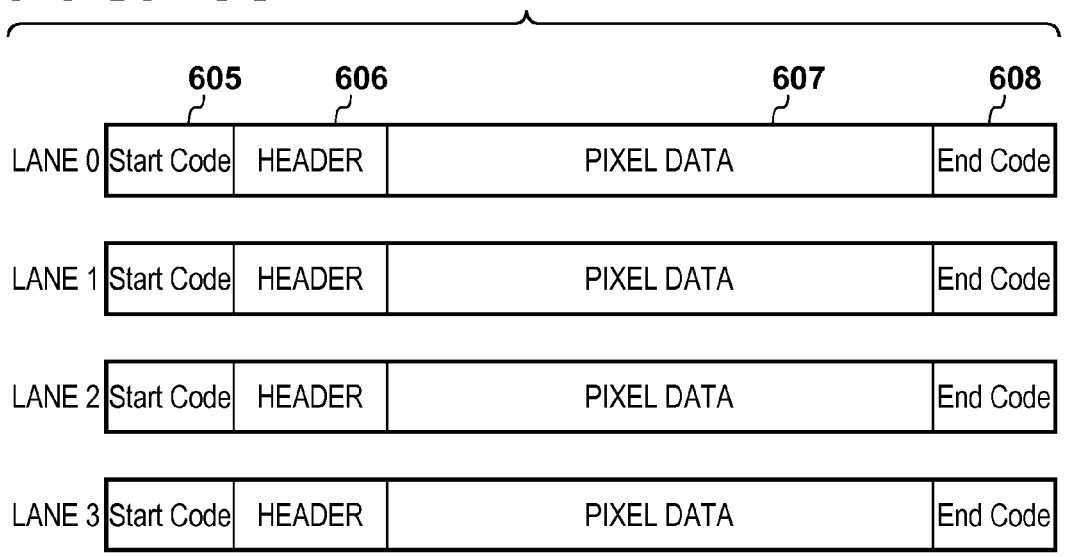

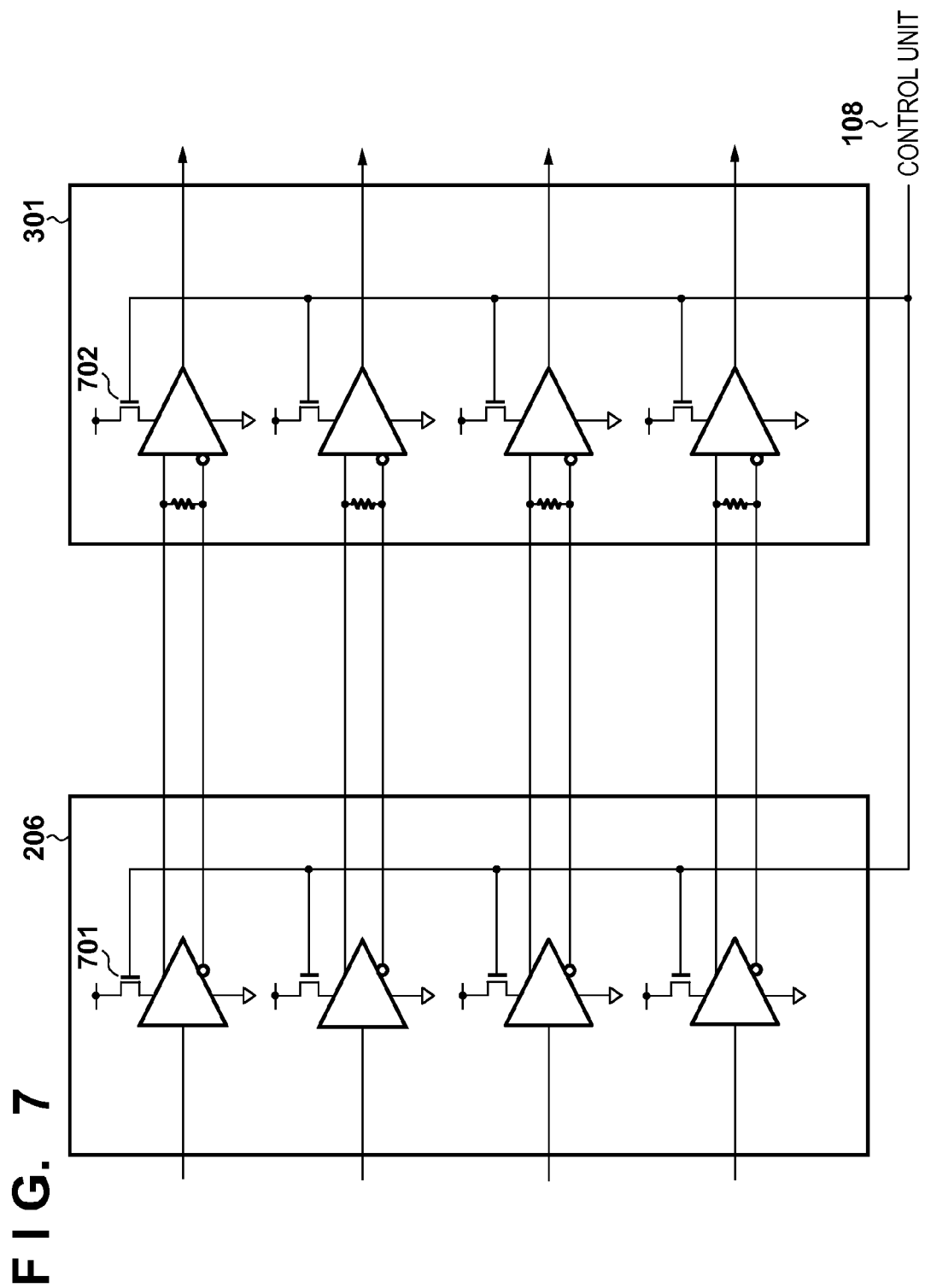

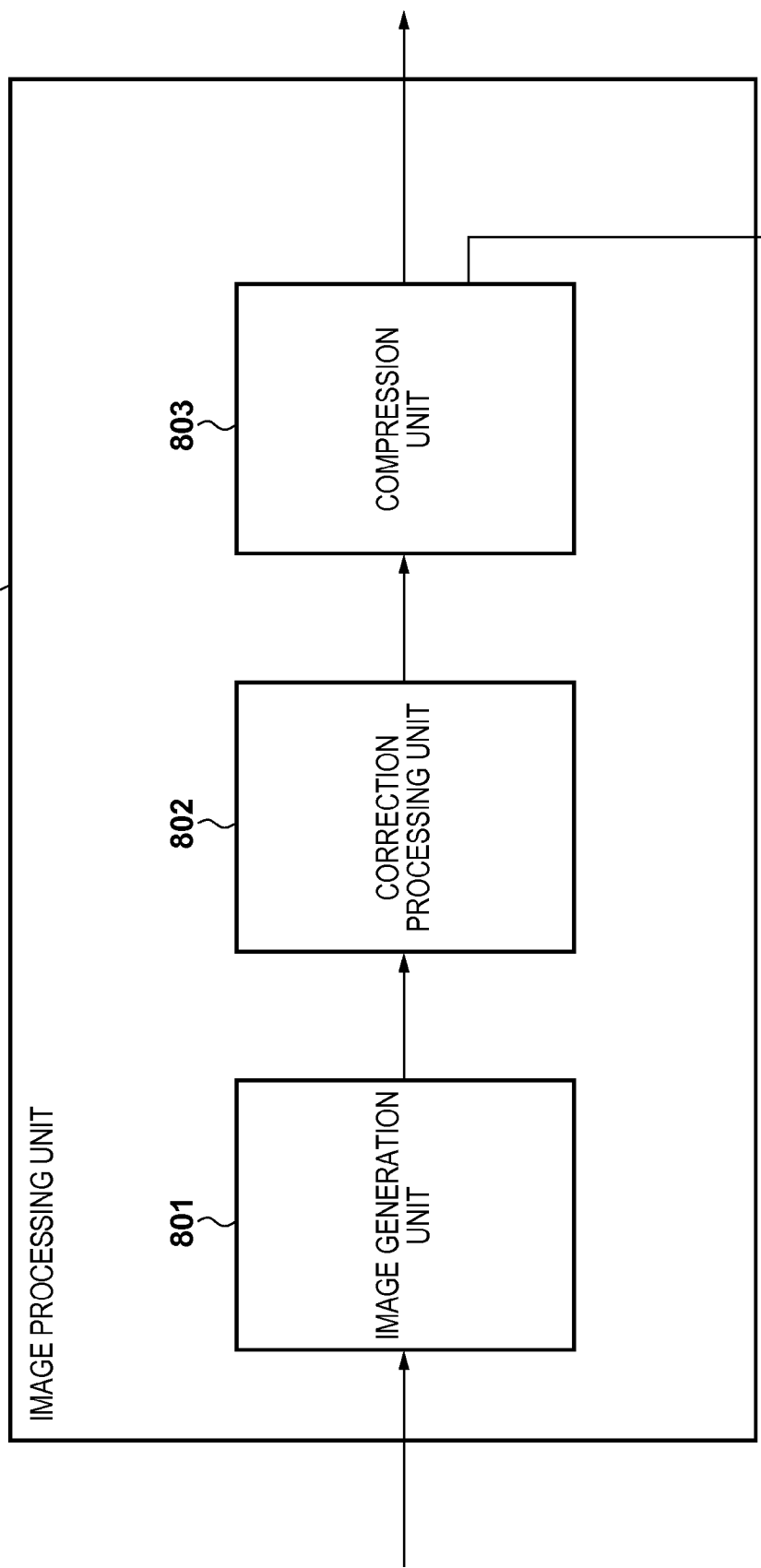

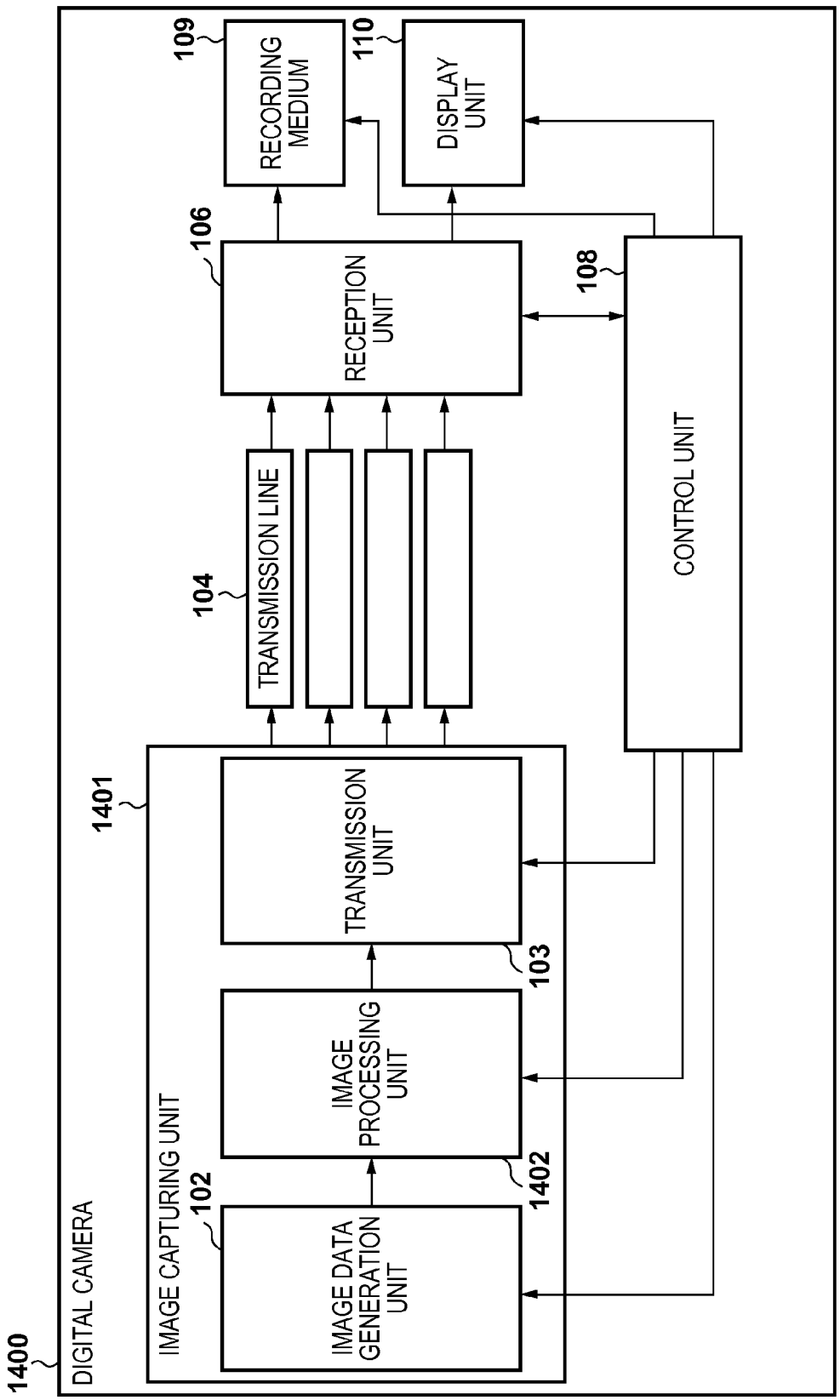

IMAGE CAPTURING APPARATUS AND CONTROL METHOD FOR THE SAME

BACKGROUND OF THE INVENTION

1. Field of the Invention

The present invention relates to an image capturing apparatus and a control method for the same, and more particularly to power control technology in an image capturing apparatus.

2. Description of the Related Art

In recent years, the transmission capacity that is required between image sensors and circuits for image processing connected thereto has increased following increases in both the pixel count of image sensors and the readout speed from image sensors. Technology for efficiently transmitting image data by transmitting image data to which header information including identification information of the pixel data has been added over a plurality of transmission lines connecting image sensors with circuits for image processing has been disclosed in this context (Japanese Patent Laid-Open No. 2012-120158).

The technology disclosed in the Japanese Patent Laid-Open No. 2012-120158 enables high capacity transmission between image sensors and circuits for image processing to be realized with smaller scale circuitry.

On the other hand, the increased number of transmission lines between image sensors and circuits for image processing following the increase in transmission capacity requirements is assumed to increase the power consumption required for transmission. Technology for controlling power supply to transmission lines between image sensors and circuits for image processing and to individual circuits in order to efficiently reduce power consumption is thus desired.

SUMMARY OF THE INVENTION

The present invention has been made in consideration of the aforementioned problems, and realizes technology that can easily reduce power consumption related to transmission or processing of data that is output from an image sensor.

In order to solve the aforementioned problems, the present invention provides an image capturing apparatus comprising: an image capturing unit configured to generate image data of an object; an adding unit configured to add additional information every predetermined amount of pixel data in the image data; a transmission unit configured to transmit image data by the amount of pixel data to which the additional information is added; an image processing unit configured to perform image processing on the image data received via the transmission unit; and a power control unit configured to control power supply when the transmission unit transmits the pixel data, based on the additional information obtained by receiving the image data, wherein the power control unit restricts the power supply to less than a predetermined power amount in a case where the additional information indicates a predetermined state, and performs power supply at the predetermined power amount in a case where the additional information does not indicate the predetermined state.

In order to solve the aforementioned problems, the present invention provides a control method of an image capturing apparatus having: an image capturing step of generating image data of an object; an addition step of adding additional information every predetermined amount of pixel data in the image data; a transmission step of transmitting image data by the amount of pixel data to which the additional information is added; an image processing step of performing image processing on the image data received via a transmission unit; and a power control step of controlling power supply when the transmission unit transmits the pixel data, based on the additional information obtained by receiving the image data, wherein, in the power control step, the power supply is restricted to less than a predetermined power amount in a case where the additional information indicates a predetermined state, and power supply is performed at the predetermined power amount in a case where the additional information does not indicate the predetermined state.

In order to solve the aforementioned problems, the present invention provides a non-transitory computer-readable storage medium storing a program for causing a computer to function as each unit of the image capturing apparatus: an image capturing unit configured to generate image data of an object; an adding unit configured to add additional information every predetermined amount of pixel data in the image data; a transmission unit configured to transmit image data by the amount of pixel data to which the additional information is added; an image processing unit configured to perform image processing on the image data received via the transmission unit; and a power control unit configured to control power supply when the transmission unit transmits the pixel data, based on the additional information obtained by receiving the image data, wherein the power control unit restricts the power supply to less than a predetermined power amount in a case where the additional information indicates a predetermined state, and performs power supply at the predetermined power amount in a case where the additional information does not indicate the predetermined state.

According to the present invention, it is possible to easily reduce power consumption related to transmission or processing of data that is output from an image sensor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A to 6C are diagrams showing an example of header and packet structures according to the first embodiment.

FIG. 7 is a diagram showing an example of a buffer configuration of transmission lines according to the first embodiment.

FIG. 8 is a block diagram showing an exemplary functional configuration of an image processing unit according to the first embodiment.

FIG. 14 is a block diagram showing an exemplary functional configuration of a digital camera serving as another mode according to the first embodiment.

DESCRIPTION OF THE EMBODIMENTS

First Embodiment

Hereinafter, illustrative embodiments of the present invention will be described in detail with reference to drawings. Note that an example in which the present invention is applied to an arbitrary digital camera that is capable of controlling power supply of transmission lines between an image sensor and a signal processing unit that processes signals output from the image sensor and power supply of the signal processing unit as an example of an image capturing apparatus will be described below. However, the present invention is not limited to a digital camera and can also be applied to arbitrary electronic devices that are capable of performing such control of power supply. These devices may include mobile phones, game machines, tablet terminals, personal computers, and wristwatch-type or spectacle-type information terminals, for example.

Configuration of Digital Camera 100

Figure 1:
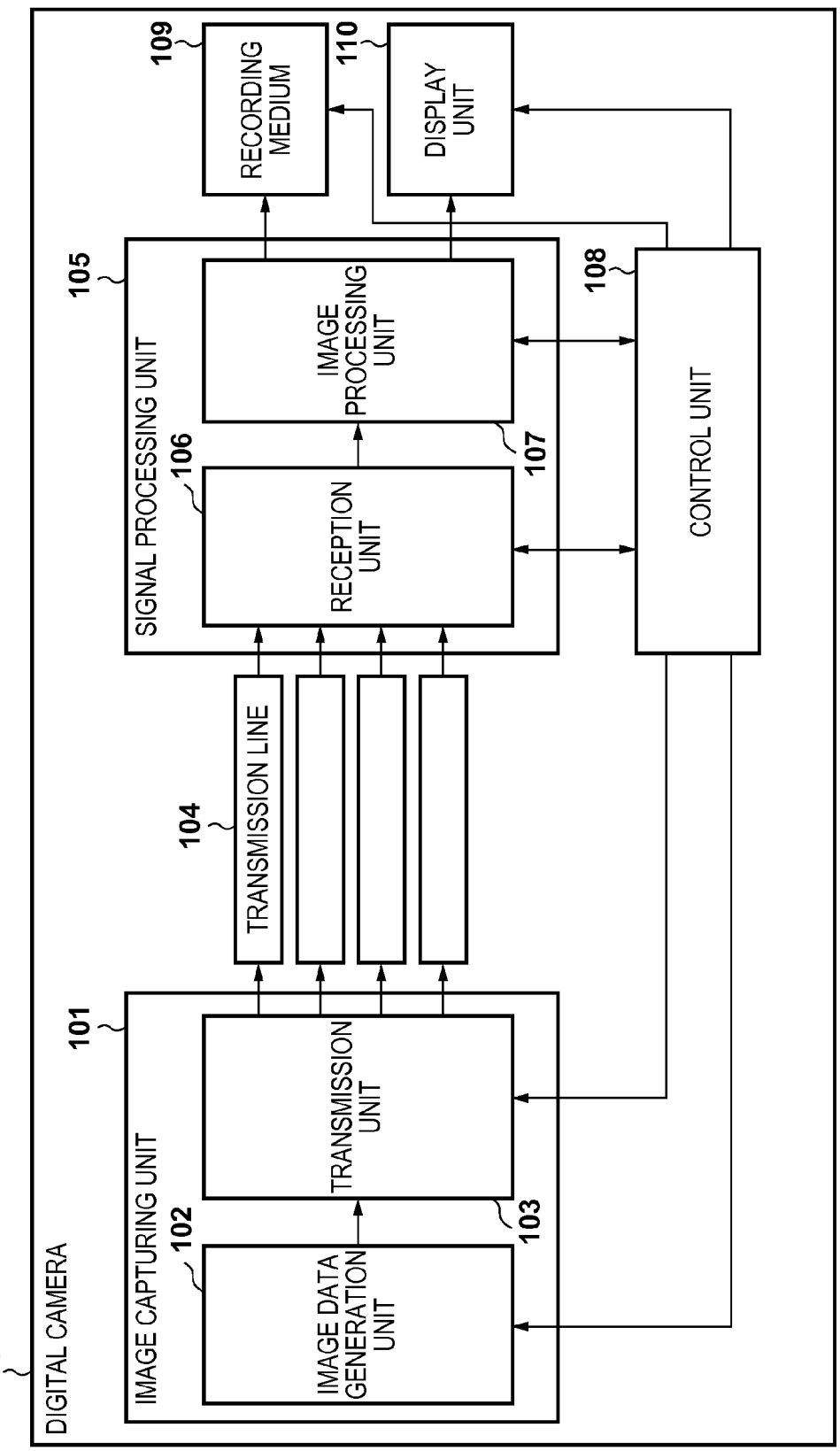
FIG. 1 is a block diagram showing an exemplary functional configuration of a digital camera as an example of an image capturing apparatus according to a first embodiment of the present invention.

FIG. 1 is a block diagram showing an exemplary functional configuration of a digital camera 100 serving as an example of an image capturing apparatus of the present embodiment. Note that one or more of the functional blocks shown in FIG. 1 may be realized by hardware such as an ASIC or a programmable logic array (PLA), or by a programmable processor such as a CPU or an MPU executing software, or alternatively by a combination of software and hardware. Accordingly, even if different functional blocks are described as performing respective operations in the following description, these operations may be performed by the same hardware.

An image capturing unit 101 is constituted by an image data generation unit 102 and a transmission unit 103. The image data generation unit 102 includes an image sensor having a configuration in which a plurality of pixels each having a photoelectric conversion element are arrayed two dimensionally. The image sensor is a CCD (Charge-Coupled Device) image sensor or a CMOS (Complementary Metal Oxide Semiconductor) image sensor, for example. The image sensor photoelectrically converts, pixel-by-pixel, an object optical image formed by an unshown image capture optical system, and further performs analog-to-digital conversion using an A/D conversion circuit and outputs digital signals (pixel data) in units of pixels constituting the image data to the transmission unit 103.

Figure 2:
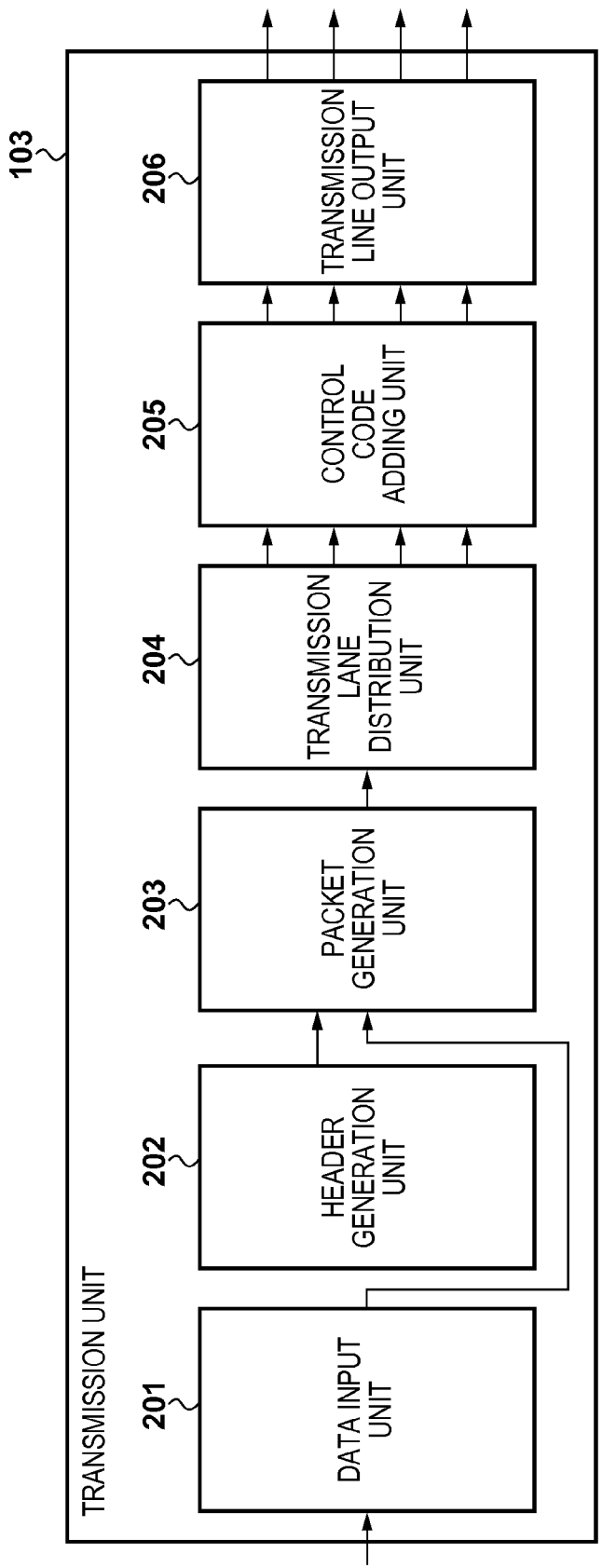
FIG. 2 is a block diagram showing an exemplary functional configuration of a transmission unit according to the first embodiment.

The configuration of the transmission unit 103 will now be described in detail with reference to FIG. 2. A data input unit 201 constituting the transmission unit 103 inputs pixel data output from the image data generation unit 102, and outputs the pixel data to a packet generation unit 203 which is a downstream processing block. A header generation unit 202 generates headers to which control information (power control information) for performing power control mentioned later is added, and outputs the headers to the packet generation unit 203.

The packet generation unit 203 adds headers generated by the header generation unit 202 to pixel data input from the data input unit 201 to generate packets. A transmission lane distribution unit 204 allots packets input from the packet generation unit 203 according to the number of transmission lanes. A control code adding unit 205 adds a control code to input packets, and outputs the packets to a transmission line output unit 206. The transmission line output unit 206 outputs packets to which a control code has been added by the control code adding unit 205 to transmission lines 104, and transmits the packets to a signal processing unit 105.

The transmission lines 104 are for transmitting data output from the image capturing unit 101 to the signal processing unit 105, and are constituted by a plurality of transmission lines. As will be discussed later, power of an amount determined in advance for each transmission line is supplied (e.g., power ON) or restricted (e.g., power OFF) by the transmission unit 103 of the image capturing unit 101 or a reception unit 106 of the signal processing unit 105, thus enabling the power supply of each transmission line to be controlled. Note that controlling power supply will be described below variously as power control, controlling power, and the like.

The signal processing unit 105 is DSP (Digital Signal Processor), for example, and is a processor for high speed execution of predetermined digital operation processing. The signal processing unit 105 further contains the reception unit 106 and an image processing unit 107.

Figure 3:
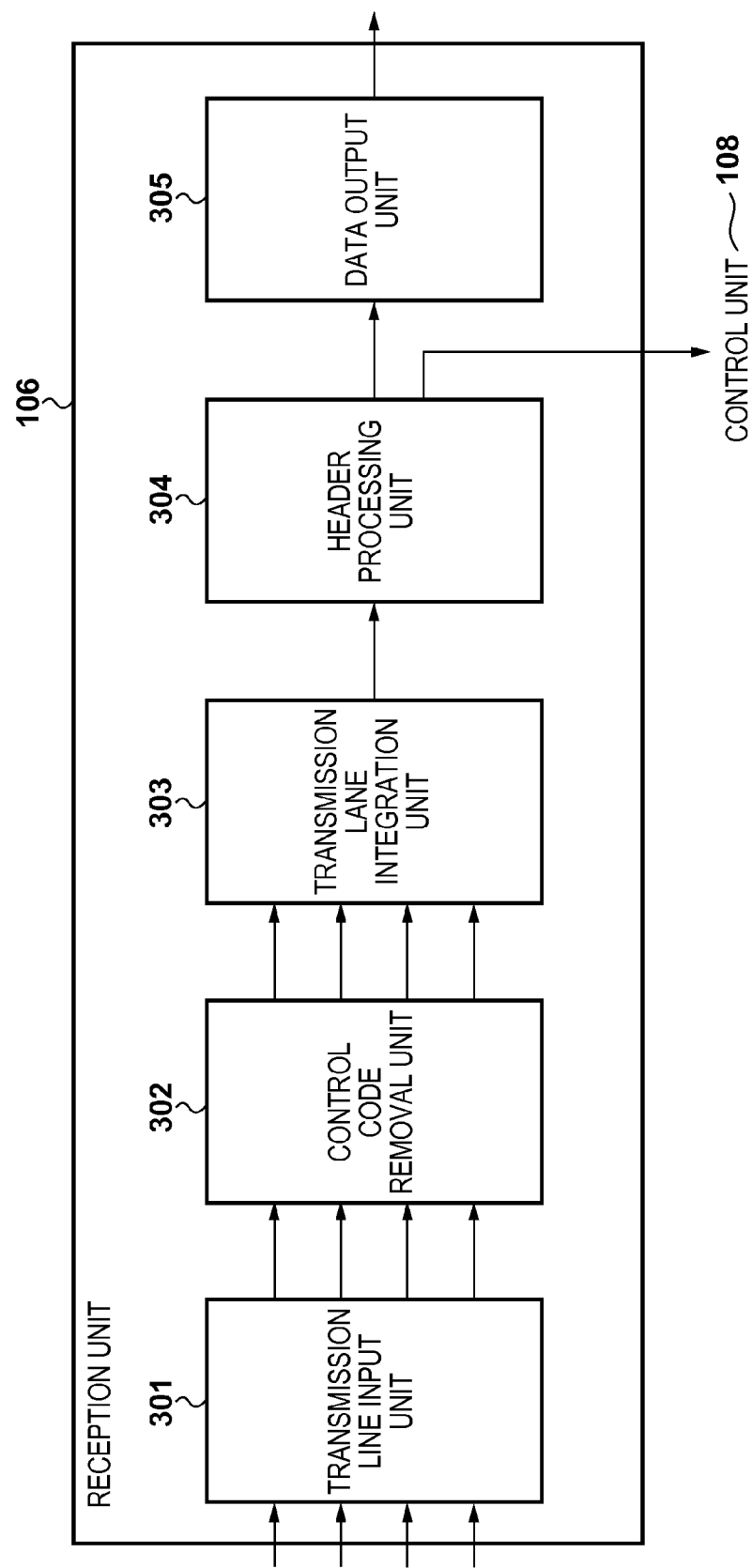
FIG. 3 is a block diagram showing an exemplary functional configuration of a reception unit according to the first embodiment.

An exemplary functional configuration of the reception unit 106 will be described in detail with reference to FIG. 3. A transmission line input unit 301 constituting the reception unit 106 receives packets transmitted from the image capturing unit 101 via the transmission lines 104. A control code removal unit 302 removes the control code from received packets, and outputs only the header and pixel data to a transmission lane integration unit 303. The transmission lane integration unit 303 collects the pixel data that was allotted to the plurality of transmission lines into one line, and outputs the collected pixel data of one line to a header processing unit 304. The header processing unit 304 acquires the power control information from the header added to the packet, and executes processing according to the power control information together with outputting only the pixel data from which the header has been removed. The header processing unit 304 communicates with a control unit 108 in order to execute processing according to the power control information. A data output unit 305 outputs pixel data input from the header processing unit 304 to the image processing unit 107.

The image processing unit 107 forms image data of one frame based on pixel data input from the reception unit 106. Furthermore, the image processing unit 107 performs various types of correction processing, such as color correction and gain correction, and compression processing on the formed image data. The image processing unit 107 outputs images or moving images that have undergone various types of processing to a recording medium 109 and a display unit 110.

The control unit 108 has a CPU or an MPU, a ROM and RAM, for example, and controls each functional block constituting the digital camera 100 by the CPU expanding programs stored in the ROM in a work area of the RAM and executing the expanded programs, for example.

The recording medium 109 is a detachable recording medium such as a memory card for recording images or moving images output from the image processing unit 107, and is constituted by a semiconductor memory, a magnetic disk or the like.

The display unit 110 displays images or moving images output from the image processing unit 107. The display unit 110 displays menu screens in order to allow the user to operate various image capture settings such as the aperture of the image capture optical system, ISO speed and the like.

Series of Operations related to Power Control Processing

Figure 4:
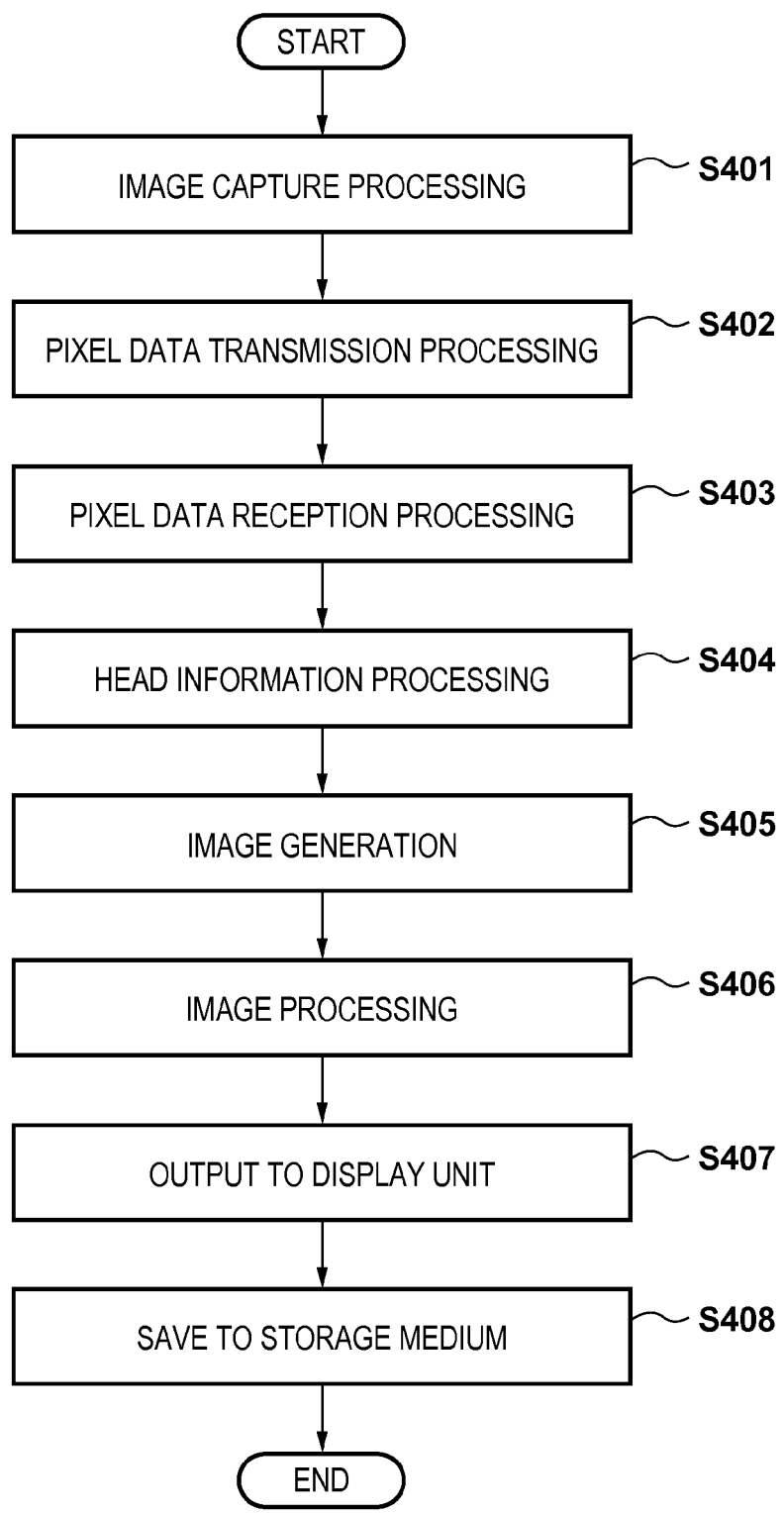
FIG. 4 is a flowchart showing a series of processing performed on pixel data including power control processing according to the first embodiment.

Next, a series of operations related to power control processing, that is, a series of processing for reducing power consumption through power control on both the transmission lines 104 and the image processing unit 107 will be described, with reference to the flowchart shown in FIG. 4 and to FIGS. 5 to 8.

Note that this processing is started in the case where an unshown image capture start button is pushed by the user in a state where live view is being displayed in the digital camera 100.

In S401, the image data generation unit 102 performs image capture processing based on an instruction from the control unit 108. The image data generation unit 102 performs appropriate exposure, and starts reading out pixel data from the image sensor. The image data generation unit 102 reads out effective pixel data in the cycle of a synchronization signal VD shown in FIG. 5, that is, one frame period, (e.g., 1/60 sec), together with sequentially reading out pixel data of a predetermined range (e.g., one line) in cycles of the synchronization signal HD. Also, a blanking period is provided after all the effective pixel data of an effective pixel region that is constituted by lines 1 to N have been read out. The image data generation unit 102 sequentially outputs the read pixel data to the transmission unit 103 line by line.

In S402, the transmission unit 103 performs processing for transmitting the pixel data read out in the image capture processing. The pixel data input to the transmission unit 103 is input to the data input unit 201 provided in the transmission unit 103. The data input unit 201 inputs pixel data to be transmitted line by line.

The header generation unit 202 generates additional information to be added to pixel data as header information. In the present embodiment, the header generation unit 202 generates header information that includes power control information for the plurality of transmission lines 104 and the image processing unit 107, for example. The header information that is generated by the header generation unit 202 is shown in FIG. 6A. Bit 0 (bit[0]) represent the power control information on the transmission lines 104, and bit 1 (bit[1]) represent the power control information of the image processing unit 107, with control being performed to turn power to an ON state when each bit is "1" and to an OFF state when each bit is "0". The header generation unit 202 is capable of adding additional information per target such as the transmission lines 104 and the image processing unit 107 to which power is supplied. Note that, in the present embodiment, the minimum 2 bits of header information required in order to respectively identify the transmission lines 104 and the image processing unit 107 as targets for power control is used, but the header information is not particularly limited to 2 bits. In order to use the header information for other applications, information such as region information or line information of the image data generation unit 102 may be further added to the additional information. Such a configuration enables power control information and corresponding pixel data to be readily specified simply by referring to the header information.

The packet generation unit 203 adds the header information generated by the header generation unit 202 to the pixel data of one line output from the data input unit 201. The packet structure of the packet in which header information has been added to the pixel data of one line will be as shown in FIG. 6B, for example. A start code 601 and an end code 604 are control codes indicating the start and end of a packet containing one line of pixel data, and power control information generated by the header generation unit 202 is set in a header 602. Pixel data 603 is one line of pixel data read from the image sensor. The packet generation unit 203 outputs packets to which header information has been added to the transmission lane distribution unit 204.

The transmission lane distribution unit 204 distributes pixel data according to the number of transmission lines. Regarding the distribution method, any method can be used, and the header and the pixel data may, for example, be distributed by being allocated in order one byte at a time from the start to lane 0, lane 1 and so on of the transmission lines. The distributed packet may be output to the control code adding unit 205, and the control code adding unit 205 may add a start code 605 and an end code 608 to the start and the end of the packet. FIG. 6C shows the packet configuration in the case where a generated packet has been distributed by being respectively allocated to a plurality of transmission lines (lane numbers 0 to 3). The start code 605 indicates the start timing of the distributed packet. Also, the end code 608 indicates the end timing of the distributed packet to the side that receives the packet. The side that receives the packet recognizes the data between the start code 605 and the end code 608 as a header 606 and pixel data 607 that have been distributed. Note that the header 606 illustrates the case where the header 602 of the distribution source is constituted by a length of 4 bytes or more, and is distributed to each transmission line. Regarding the header of the distribution source in a case where the header 602 is less than 4 bytes, processing such as not inserting header information or inserting data for padding may be performed. The control code adding unit 205 outputs packets to the transmission line output unit 206 once the start code 605 and the end code 608 have been added. Packets input to the transmission line output unit 206 are output to corresponding transmission lines among the plurality of transmission lines 104, and transmitted to the reception unit 106 of the signal processing unit 105.

In S403, the reception unit 106 performs processing for receiving the captured pixel data. The packets received via the plurality of transmission lines 104 are input to the transmission line input unit 301. At this time, the packet that should be received is discriminated from the position of the start code 601 and the end code 604 of the packets. Packets input to the transmission line input unit 301 are output to the control code removal unit 302, and the control code removal unit 302 removes the control code of the packets. In other words, the packets will be constituted by only the header 602 and the pixel data 603.

The transmission lane integration unit 303 collects the pixel data received via the plurality of transmission lines and combines the pixel data into one line of pixel data again.

Figure 5:
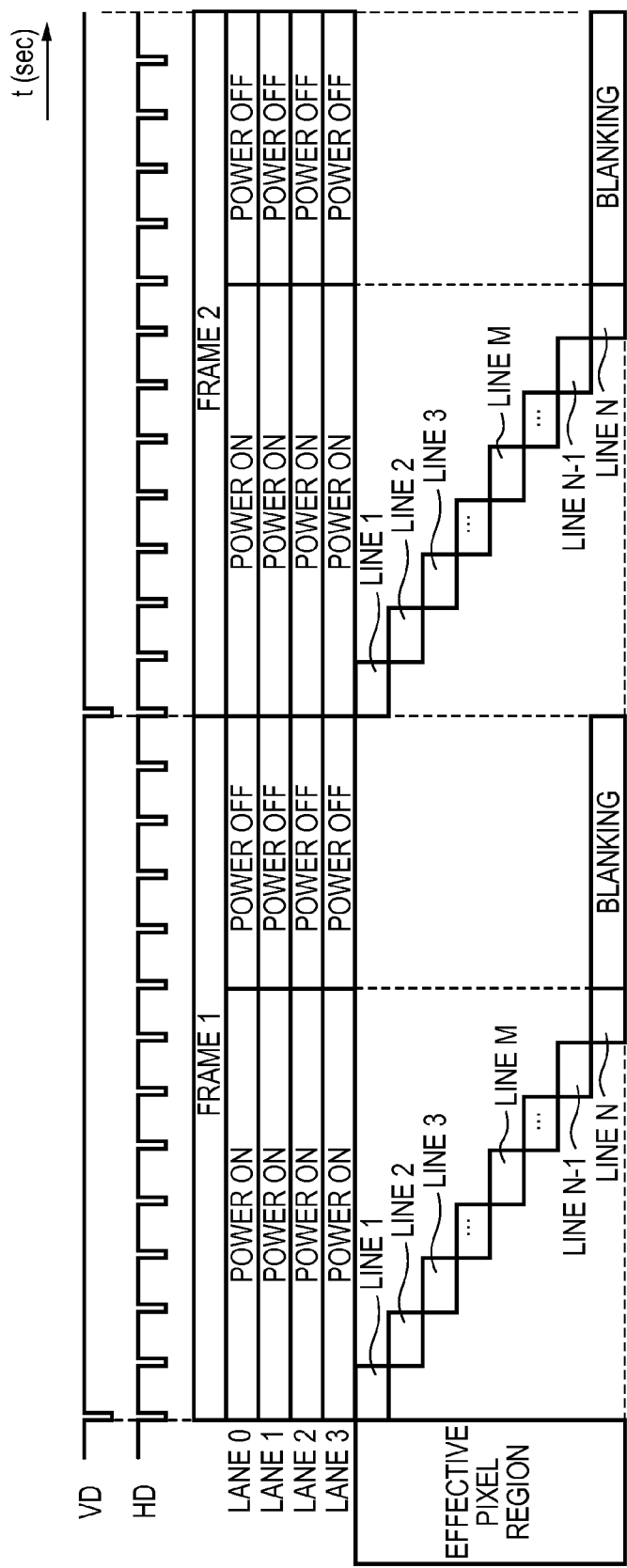
FIG. 5 is a diagram showing a readout timing of pixel data and a power supply state on individual transmission lines according to the first embodiment.

In S404, the header processing unit 304 processes the header information. The header processing unit 304 executes processing according to the header information that accompanies the input packet, at the same time that the combined packets are input. As shown in FIG. 5, the effective pixel region of the image data generation unit 102 is assumed to be from the 1st line to the Nth line. In this case, bit[0] of the power control information added to pixel data from the 1st line to the N−1th line is set to "1", and bit[0] of the power control information added to pixel data of the Nth line is set to "0", for example.

Here, buffer configurations of the transmission line output unit 206 and the transmission line input unit 301 are shown in FIG. 7. In the case where bit[0] of the power control information is "1", the header processing unit 304 turns ON a power control switch 701 of the transmission line output unit 206 and a power control switch 702 of the transmission line input unit 301 via the control unit 108. Also, in the case where bit[0] of the power control information is "0", the header processing unit 304 turns OFF the power control switch 701 of the transmission line output unit 206 and the power control switch 702 of the transmission line input unit 301 via the control unit 108. In other words, the header processing unit 304 performs control to turn OFF the power supply of the transmission line output unit 206 and the transmission line input unit 301 after the pixel data of the Nth line, which is the end of the effective pixel region, is transmitted. That is, it is possible to control the power (or power supply state) of the transmission lines, based on the power control information added to received pixel data. Accordingly, power control can be performed at a stricter timing, since the image capturing unit 101 is capable of transmitting power control information at the timing that data is read out from the image capturing unit 101, and the signal processing unit 105 is capable of processing power control information at the timing that pixel data is received.

Next, in S405, the image processing unit 107 performs image generation processing on the pixel data input from the data output unit 305. The configuration of the image processing unit 107 is shown in FIG. 8. The image generation of S405 is performed in an image generation unit 801, various types of correction processing are performed in a correction processing unit 802, and processing for compressing the corrected pixel data is performed in a compression unit 803. The image generation unit 801 forms an image from one frame of pixel data from the data output unit 305.

In S406, the correction processing unit 802 and the compression unit 803 then perform image processing, that is, the abovementioned various types of correction processing and compression processing, on the formed image. The compression unit 803, upon completion of processing on the image of one frame, transmits a completion notification conveying that all of the processing of the image processing unit 107 has been completed to the control unit 108. The control unit 108 controls clock supply or power supply to the image processing unit 107, based on the received completion notification and bit[1] of the power control information in the header. Also, the compression unit 803 may directly execute control of clock supply or control of power supply to the image processing unit 107. For example, assume that bit[1] of the power control information of the header that is added to pixel data of the 1st to N−1th lines is set to "1". In this case, clock supply or supply of power to each block of the image processing unit 107 is performed. On the other hand, bit[1] of the power control information in the header of the Nth line is set to "0", and notification of completion of processing by the compression unit 803 when one frame of image processing has ended is transmitted to the control unit 108. Based on the power control information in the header and the notification of completion of processing by the compression unit 803, the control unit 108 stop clock supply or turns OFF power supply to the image processing unit 107.

In S407, the control unit 108 controls the display unit 110 to display the formed image data, after completing power control on the image processing unit 107. Furthermore, the series of operations related to the power control processing ends when the image data is saved to the recording medium 109 in S408.

As described above, power consumption for the period (hereinafter, blanking period) shown in FIG. 5 during which pixel data is not read can be reduced by performing power control on the transmission lines and the image processing unit 107 based on header information, that is, power control information, added to the pixel data of the effective pixel region.

Furthermore, processing for turning ON power of the transmission lines and the image processing unit 107 when reading out of pixel data of the next frame is started again, in the case where power of the transmission lines and the image processing unit 107 was turned OFF by the above-mentioned power control processing, will be described.

In the case of turning ON power supply to the transmission lines 104 and the image processing unit 107 in the next frame, the control unit 108 controls the transmission lines 104 and the image processing unit 107 in the blanking period using serial communication from the control unit 108, for example. In order to reduce power consumption as much as possible, the communication timing can be set to immediately before the next frame is started. The specific timing may be 1 HD period immediately before the start of frame 2 shown in FIG. 5, for example, and the control unit 108 may transmit serial communication during this period. Also, the power supply of the transmission lines 104 and the image processing unit 107 may be turned ON in synchronization with the frame synchronization signal VD shown in FIG. 5. Such a configuration enables consumption of power to be suppressed until the timing at which power for transmitting and receiving pixel data is required.

Note that the present embodiment is also applicable to the configuration of a digital camera 1400 shown in FIG. 14. That is, in comparison to the configuration of the digital camera 100 of FIG. 1, an image processing unit 1402 is included in an image capturing unit 1401. Pixel data read out from the image data generation unit 102 undergoes various types of image processing in the image capturing unit 1401, and is then converted into packets by the transmission unit 103 and output to the reception unit 106 via the transmission lines 104. The header processing unit 304 of the reception unit 106 controls the power supply to the transmission lines 104 and the clock supply or power supply to the image processing unit 1402, based on bit[0] and bit[1] of the power control information in the header. If bit[0] of the power control information is "1", the header processing unit 304 turns ON the power control switch 701 of the transmission line output unit 206 and the power control switch 702 of the transmission line input unit 301 via the control unit 108. Also, in the case where bit[0] of the power control information is "0", the header processing unit 304 turns OFF the power control switch 701 of the transmission line output unit 206 and the power control switch 702 of the transmission line input unit 301. Accordingly, the header processing unit 304 turns OFF the power supply of the transmission line output unit 206 and the transmission line input unit 301, after the pixel data of the Nth line, which is the end of the effective pixel region, is transmitted, similarly to the operations in the digital camera 100.

On the other hand, regarding the power control of the image processing unit 1402, in the case where bit[1] of the power control information in the header added to the pixel data of the Nth line is "0", the header processing unit 304 stops clock supply or turns OFF power supply to the image processing unit 1402. Also, the header processing unit 304 powers ON the transmission lines 104 and the image processing unit 1402 before readout of the next frame is started again, after powering OFF the transmission lines 104 and the image processing unit 1402, similarly to the digital camera 100. At this time, the header processing unit 304 turns ON each power supply based on serial communication and the frame synchronization signal VD.

Note that in the power control of each embodiment, examples are described in which power supply is controlled by turning power ON and OFF with respect to each functional block such as the transmission lines 104 or the image processing unit 107. However, the power supply of each constituent element does not necessarily need to be turned OFF, and may be changed or transitioned to a power supply state in which power consumption is reduced, such as a power saving state, for example. Power consumption related to transmission of data output from the image sensor or the series of signal processing can be easily reduced, even with such a configuration. In this case, the header generation unit 202 allocates "1" with a state where the power supply is turned ON as the normal power supply state, and allocates "0" to a power saving state in which power consumption is less than usual, in power control information settings, for example.

As described above, in the present embodiment, a configuration is adopted in which power control information is added as header information to packets containing pixel data that is generated by the image capturing unit 101. Power that is supplied to the transmission lines 104 or the image processing unit 107 is then controlled according to the power control information in the reception unit 106 that received pixel data from the image capturing unit 101. Such a configuration enables the image capturing unit 101 to transmit power control information dynamically (i.e., according to operating conditions) at the timing that pixel data is read out from the image capturing unit 101. Furthermore, since the signal processing unit 105 is able to process the power control information at the timing that pixel data is received, power control can be performed at a stricter timing on transmission and reception of pixel data. That is, it becomes possible to easily reduce power consumption related to transmission or processing of data output from the image sensor.

Second Embodiment

Next, the second embodiment will be described. The second embodiment differs from the first embodiment in that a configuration that enables at least one of the plurality of transmission lines to be powered ON at all times to enable packets to be transmitted is adopted. More specifically, a transmission line output unit 901 and a transmission line input unit 902 of the present embodiment differ from the first embodiment, while the remaining configuration is the same as the first embodiment. The same reference signs are thus given to configuration that is the same and overlapping description will be omitted, with a focus on describing the differences.

Figure 9:
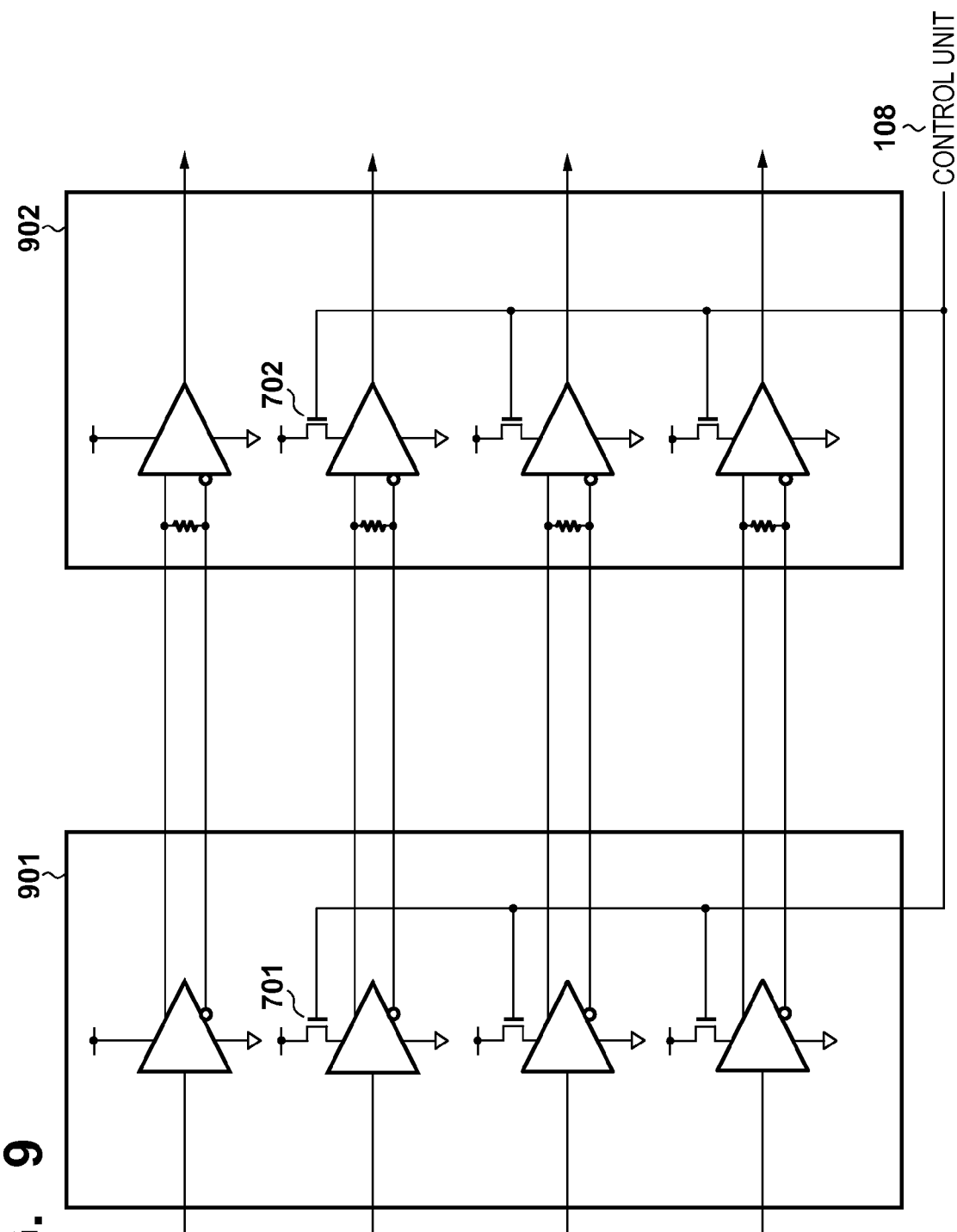
FIG. 9 is a diagram showing an example of a buffer configuration of transmission lines according to a second embodiment.

Buffer configurations of the transmission line output unit 901 and the transmission line input unit 902 of the transmission lines will be described with reference to FIG. 9. When bit[0] of the power control information of the Nth line of the effective pixel region is "0", three of the four lanes of the buffers of the transmission line output unit 901 and the transmission line input unit 902 are powered OFF, and one lane is maintained in an ON state. This is to secure a transmission line for transmitting the header using one lane during the blanking period from the Nth line onward. That is, power control information can be transmitted during the blanking period.

Figure 10:
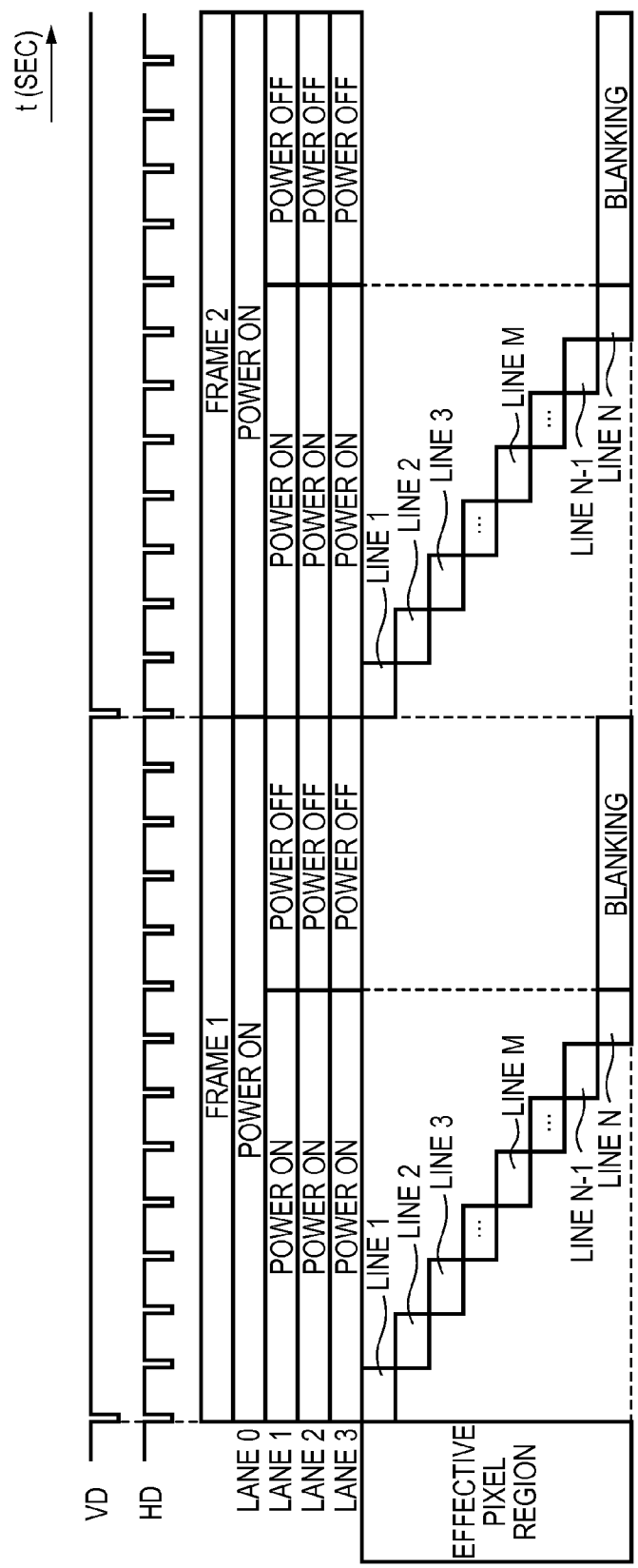
FIG. 10 is a diagram showing a readout timing of pixel data and a power supply state on individual transmission lines according to the second embodiment.

FIG. 10 shows a timing chart of the present embodiment. Unlike FIG. 5 mentioned above, the transmission line of lane 0 is powered ON at all times. Before reading out of the pixel data (line 1) of the frame 2 is started, bit[0] of the power control information is set to "1" and transmission is performed using a transmission line (lane 0). Note that the pixel data at the time of transmitting the power control information may be dummy data or empty data. The header processing unit 304 issues a notification to the control unit 108 based on this power control information, so as to power ON the three transmission lines that are powered OFF.

As described above, the timing at which power is restored to the other transmission lines that are powered OFF can be easily controlled using a configuration that powers ON at least one lane of the transmission lines at all times. That is, power can be restored to the other transmission lines that are powered OFF in accordance with the timing at which reading out of the pixel data of the first line of the frame starts. Also, in the first embodiment, since the control unit 108 performs control for turning power ON, the control unit 108 needs to perform control to turn power ON after monitoring the VD and HD periods. However, a configuration for performing the abovementioned monitor in the control unit 108 is not necessary if the present embodiment is employed.

As described above, in the present embodiment, a configuration is adopted in which at least one of the plurality of transmission lines is powered ON at all times in order to transmit and receive power control information, enabling power control information to be transmitted immediately before transmission of the pixel data of the next frame is started. Such a configuration enables the timing at which power is restored to the other transmission lines that are powered OFF to be easily controlled, in addition to enabling power consumption related to transmission or processing of data output from the image sensor to be easily reduced. Also, since the control unit 108 no longer needs to monitor the VD and HD periods, the configuration of the control unit 108 for restoring transmission lines can be simplified.

Third Embodiment

A third embodiment will furthermore be described. The present embodiment differs from the abovementioned embodiments in having a configuration that includes line information of pixel data in the header instead of bits for power control. The configuration of each functional block may be the same as the abovementioned embodiments, and thus the same reference signs are given to configuration that is the same and overlapping description will be omitted, with a focus on describing the differences.

Figure 11:
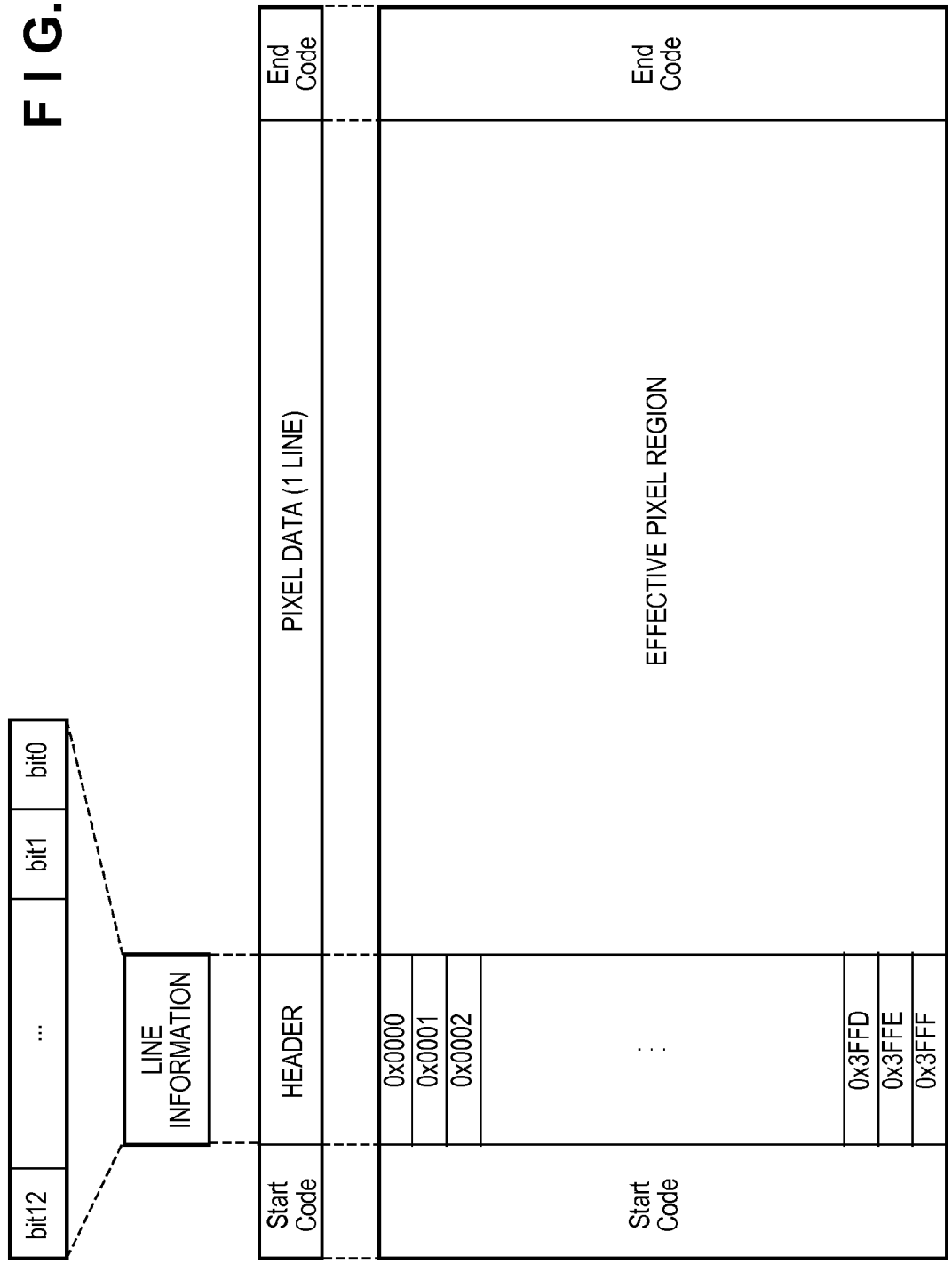
FIG. 11 is a diagram showing an example of header and packet structures according to the second embodiment.

FIG. 11 shows the structure of a header and a packet that are used in the present embodiment. In the present embodiment, 13-bit line information is set as header information, and power control of the transmission lines 104 and the image processing unit 107 is performed based on a header representing the line information of pixel data. Note that header information is not limited to 13 bits.

Figure 12:
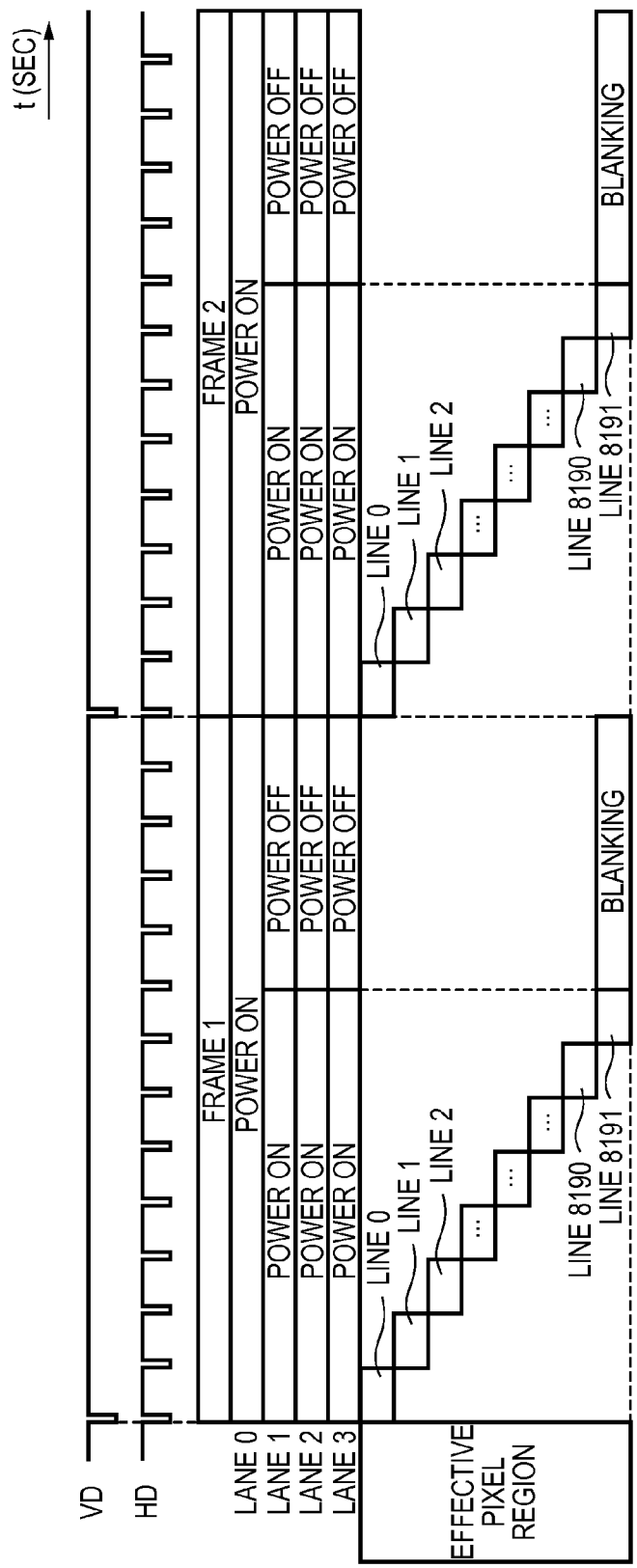
FIG. 12 is a diagram showing a readout timing of pixel data and a power supply state on individual transmission lines according to a third embodiment.

The header processing unit 304 is capable of obtaining the line information of a given line from the header. For example, in the case where the effective pixel region of an image data generation unit 102 is constituted by lines 0 to 8191 as shown in FIG. 12, line information showing the line to which each line corresponds is set as the header. Note that the present embodiment will be described assuming a state where one of the plurality of transmission lines is powered ON at all times, similarly to the second embodiment.

For example, in the case of controlling the power of the transmission lines 104 during the blanking period when the last line of the effective pixel region is the 8191st line, as shown in FIG. 12, the header processing unit 304 notifies the control unit 108 to start power control of the transmission lines 104 based on the line information on the 8191st line. For example, the header processing unit 304 issues a notification to start power control, in the case where the line described in the header matches a line number for changing the state of the power supply that is stored in advance. The control unit 108 turns OFF the power control switches 701 and 702 shown in FIG. 7, in accordance with the power control start notification from the header processing unit 304. Also, the header processing unit 304 may be configured to turn OFF the power control switches 701 and 702 directly.

On the other hand, the control unit 108, in the case of controlling the power of the image processing unit 107, controls clock supply or power supply to the image processing unit 107, based on the line information in the header and a completion notification transmitted from the compression unit 803 that conveys that all of the processing of the image processing unit 107 is completed. Note that the compression unit 803 may execute direct control of clock supply or power supply to the image processing unit 107.

The control unit 108 controls the transmission lines 104 and the image processing unit 107 during the blanking, similarly to the abovementioned embodiments, in the case of powering ON the transmission lines 104 and the image processing unit 107 for the next frame.

As described above, in the present embodiment, power control of the transmission lines 104 and the image processing unit 107 is performed using bits representing the line information of the effective pixel region rather than the dedicated bits for power control used in the abovementioned embodiments. Such a configuration enables power control of the transmission lines 104 and the image processing unit 107 to be performed with a simple configuration, without needing to newly provide dedicated bits for power control as in the abovementioned embodiments. That is, if bits indicating line information are provided due to other requirements, power control of the transmission lines 104 and the image processing unit 107 can be performed utilizing this information.

Fourth Embodiment

A fourth embodiment will furthermore be described. The present embodiment differs from the abovementioned embodiments in that power control of an image data generation unit 1300 is performed in addition to power control of the transmission lines 104 and the image processing unit 107. The configuration apart from the image data generation unit 1300 may be the same as the abovementioned embodiments, and thus the same reference signs are given to configuration that is the same and overlapping description will be omitted, with a focus on describing the differences.

Figure 13:
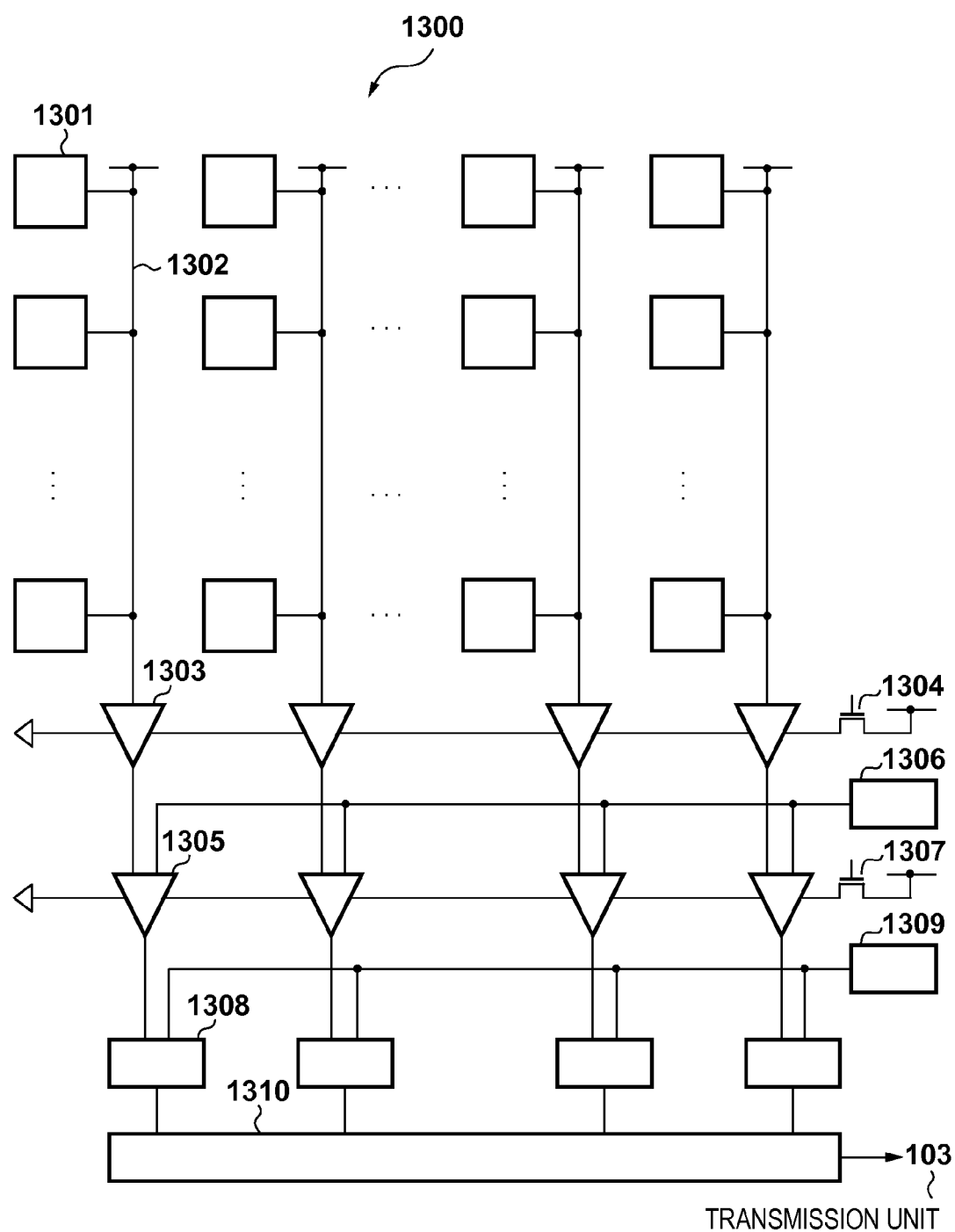
FIG. 13 is a block diagram showing an exemplary functional configuration of the image data generation unit according to a fourth embodiment.

The configuration of the image data generation unit 1300 according to the present embodiment is shown in FIG. 13. Pixel units 1301 having a photoelectric conversion region are connected in a column direction by vertical output lines 1302, and the output of each pixel unit 1301 is input to a column amplifier 1303. The power supply of each column amplifier 1303 is controlled by a control switch 1304. Pixel signals to which a predetermined gain is applied by the column amplifiers 1303 are input to comparators 1305. The signal of a reference signal generator 1306 is input to another input of the comparators 1305, and the comparators 1305 compare the pixel signals with a reference signal. Also, the power supply of the comparators 1305 is controlled with a control switch 1307.

The output of the comparators 1305 is input to latch circuits 1308, and a counter value of a counter 1309 at the timing at which the output of the comparators 1305 changes is latched. A column memory 1310 stores latched counter values as digital signals, and outputs pixel data to the transmission unit 103 connected to the image data generation unit 1300 every column.

Next, power control in the present embodiment will be described. In the present embodiment, the power supply of the column amplifiers 1303 and the comparators 1305 is controlled, in addition to the abovementioned power control of the transmission lines 104 and the image processing unit 107.

The header processing unit 304 of the reception unit 106 turns ON the control switch 1304 and the control switch 1307, in addition to the power control switch 701 and the power control switch 702, when bit[0] of the power control information is "1". In other words, the power supply of the transmission line output unit 206, the transmission line input unit 301, the column amplifiers 1303 and the comparators 1305 is set to ON for the period during which the pixel data from the 1st line to the N−1th line of the effective pixel region is transmitted. On the other hand, in the case where bit[0] of the power control information is "0", the header processing unit 304 turns OFF the control switch 1304 and the control switch 1307, in addition to the power control switch 701 and the power control switch 702. Accordingly, the transmission line output unit 206, the transmission line input unit 301, the column amplifiers 1303, and the comparators 1305 are powered OFF, after the pixel data of the Nth line, which is the end of the effective pixel region, is transmitted.

Also, with respect to the column amplifiers 1303 and comparators 1305 that are powered OFF, the control unit 108 performs control to power ON the column amplifiers 1303 and the comparators 1305 using serial communication, for example, at a predetermined timing before the end of the blanking period, for example.

In the present embodiment as described above, the various types of internal power supplies of not only the transmission lines 104 and the image processing unit 107 but also the image data generation unit 1300 are dynamically controlled in a one frame period. Such a configuration enables consumption of power in an image capturing unit to be further reduced, and power consumption for the system as a whole to be further suppressed.

OTHER EMBODIMENTS

Figure 15A:
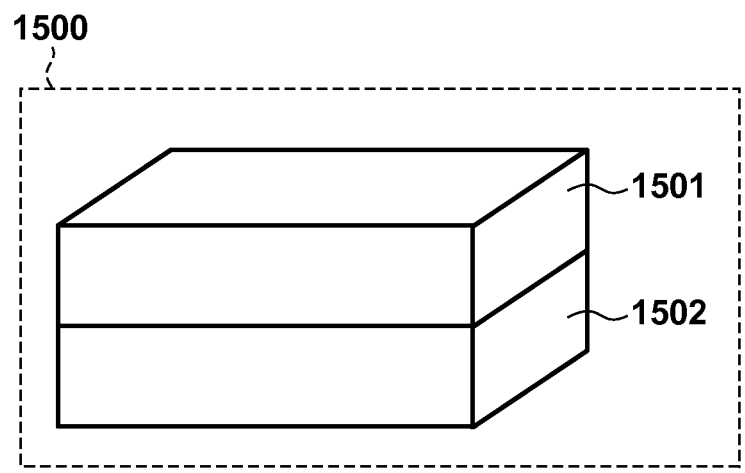
FIGS. 15A to 15B are diagrams showing an example of an image sensor having a stacked structure according to another embodiment.
Figure 15B:
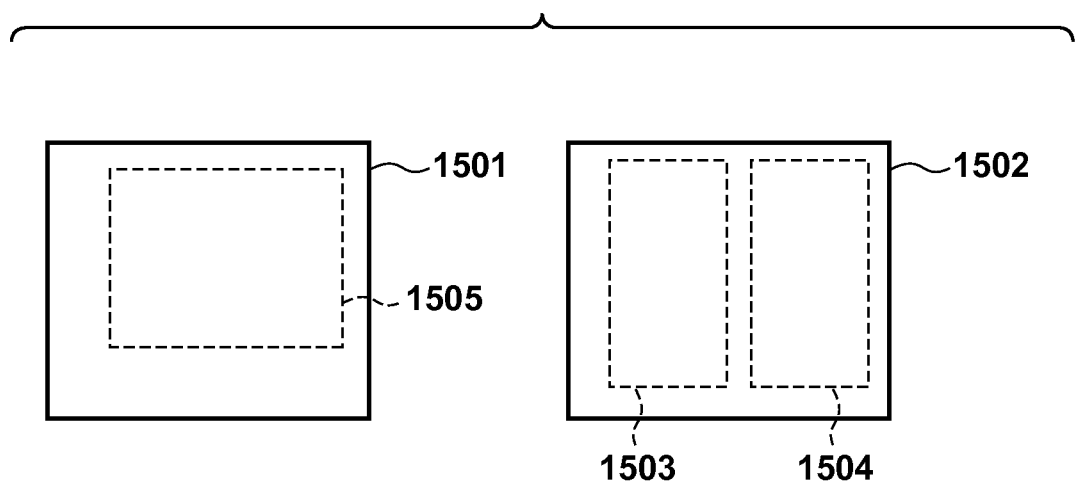

The present invention is also applicable to other embodiments shown below. For example, the present invention can be applied to an image sensor 1500 having a stacked structure shown in FIGS. 15A and 15B. As shown in FIGS. 15A and 15B, in the image sensor 1500 of the present embodiment, a chip 1501 for the image sensor and a chip 1502 for high-speed logic processes are stacked at chip level. FIG. 15A shows an oblique projection view, and FIG. 15B shows a top view of each chip. The chip 1501 for the image sensor includes a region that contains a pixel unit 1505, and the chip 1502 for high-speed logic processes includes portions 1503 and 1504 capable of performing high-speed processing on data including digital data, such as a column AD conversion circuit and a horizontal scanning circuit. In the configuration of FIG. 14 described above, the pixel units of the image sensor that is included in the image data generation unit 102 corresponds to the pixel unit 1505 of the chip 1501 for image sensors. Also, a configuration may be adopted in which the column AD conversion circuit and the horizontal scanning circuit of the image sensor that is included in the image data generation unit 102, circuits other than those of the image sensor, the image processing unit 1402 and the transmission unit 103 are disposed in the chip 1502 for high-speed logic processes.

Figure 16:
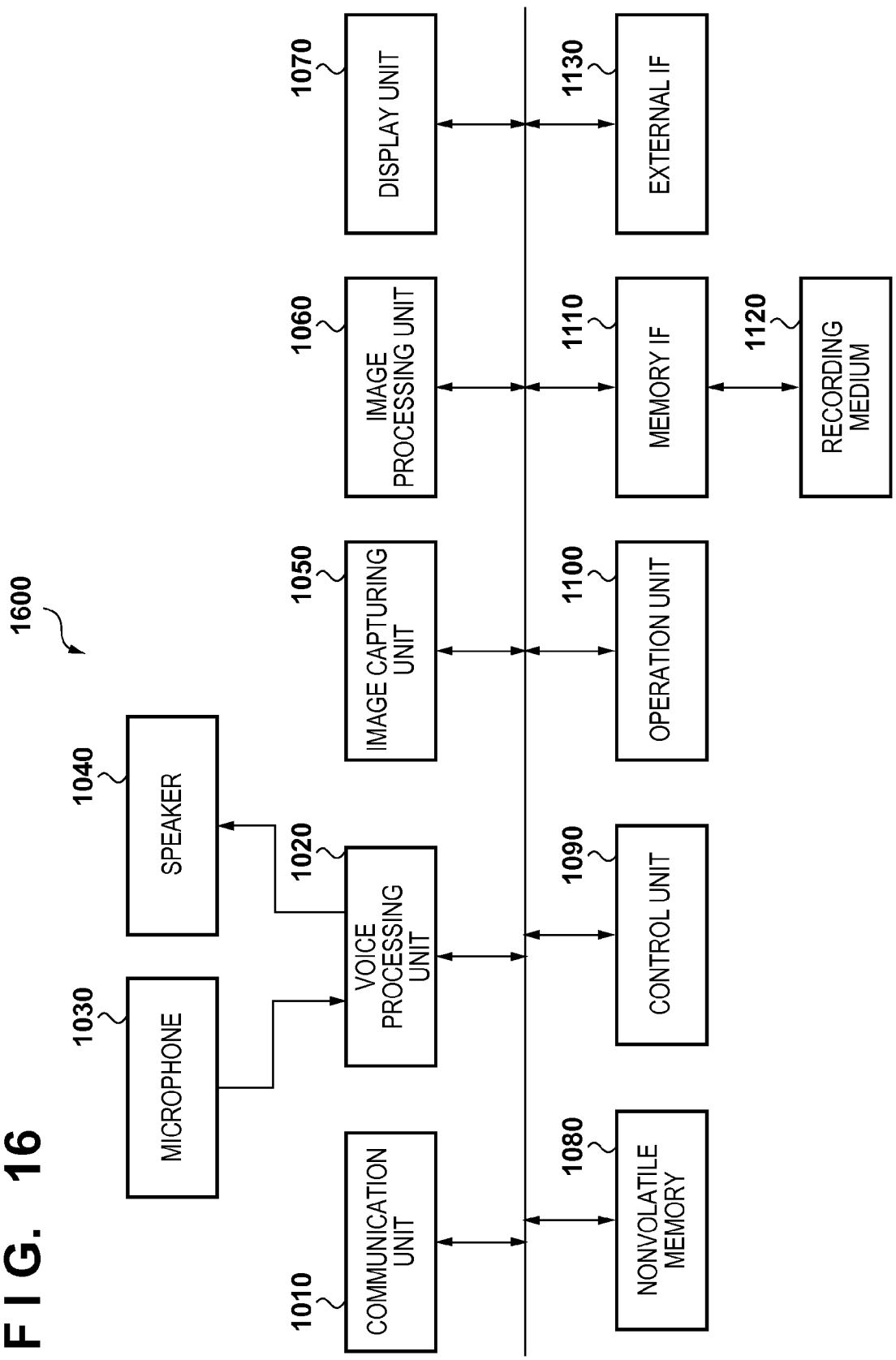
FIG. 16 is a block diagram showing an exemplary functional configuration of a mobile phone serving as an example of an image capturing apparatus according to another embodiment.

Furthermore, the present invention is also applicable to a mobile phone 1600 shown in FIG. 16 as an example of an image capturing apparatus. FIG. 16 is a block diagram showing the functional configuration of the mobile phone 1600. The mobile phone 1600 has functions including an e-mail function, an Internet connection function and an image capture and playback function, apart from a voice call function. A communication unit 1010 performs communication of voice data and image data with another phone using a communication system compliant with a communication carrier contracted by the user. A voice processing unit 1020, at the time of a voice call, converts voice data from a microphone 1030 into a form suitable for an outgoing call and sends the resultant data to the communication unit 1010. Also, the voice processing unit 1020 decodes voice data from a communication partner sent from the communication unit 1010, and sends the decoded voice data to a speaker 1040. An image capturing unit 1050 captures an image of an object and outputs pixel data. The image capturing unit 1050 includes the image capturing unit 101 or the image capturing unit 1401 described above in the embodiments. Also, the image capturing unit 1050 and an image processing unit 1060 are assumed to be connected by the plurality of transmission lines 104 described above in the embodiments. The image processing unit 1060 includes the signal processing unit 105 described above in the embodiments, and, at the time of image capture, processes pixel data captured by the image capturing unit 1050 that is input via the transmission lines 104, converts the processed pixel data to a form suitable for recording, and outputs the resultant data. Also, the image processing unit 1060, at the time of playback of a recorded image, processes the played image, and sends the processed image to a display unit 1070. The display unit 1070 is provided with a liquid crystal display panel of about several inches, and displays various types of screens according to instructions from the control unit 1090. A nonvolatile memory 1080 stores data such as address book information, e-mail data, and image data captured by the image capturing unit 1050.

A control unit 1090 has a CPU, a memory and the like, and controls the various units of the mobile phone 1600 in accordance with a control program stored in an unshown memory. An operation unit 1100 is provided with a power button, number keys, and various types of operation keys for the users to input data. A memory IF 1110 performs recording and playback various types of data with respect to a recording medium 1120 such as a memory card. An external IF 1130 transmits data stored in the nonvolatile memory 1080 and the recording medium 1120 to external devices, and receives data transmitted from external devices. The external IF 1130 performs communication using well-known communication system including wired communication such as USB and wireless communication.

Next, the voice call function in the mobile phone 1600 will be described. In the case of making a call to a communication partner, the user operates the number keys of the operation unit 1100 to input the number of the communication partner, or the address book stored in the nonvolatile memory 1080 is displayed on the display unit 1070, and the user selects a communication partner and instructs an outgoing call. When an outgoing call is instructed, the control unit 1090 makes an outgoing call to the communication partner through the communication unit 1010. When the communication partner takes the call, the communication unit 1010 outputs voice data of the communication partner to the voice processing unit 1020 and transmits voice data of the user to the communication partner.

Also, in the case of transmitting an e-mail, the user instructs e-mail creation using the operation unit 1100. When e-mail creation is instructed, the control unit 1090 displays a screen for creating an e-mail on the display unit 1070. The user inputs a destination address and text using the operation unit 1100, and instructs transmission. The control unit 1090, upon e-mail transmission being instructed, sends the address information and the e-mail text data to the communication unit 1010. The communication unit 1010 converts the data of the e-mail into a form suitable for communication, and sends the resultant data to the destination. Also, the communication unit 1010, upon receiving an e-mail, converts the data of the received mail into a form suitable for display, and displays the resultant data on the display unit 1070.

Next, the image capture function of the mobile phone 1600 will be described. When still image capture or moving image capture is instructed after the user has operated the operation unit 1100 to set an image capture mode, the image capturing unit 1050 captures still image data or moving image data, and sends the captured data to the image processing unit 1060. The image processing unit 1060 processes the captured still image data or moving image data, and stores the processed data in the nonvolatile memory 1080. Also, the image processing unit 1060 sends the captured still image data and moving image data to the memory IF 1110. The memory IF 1110 stores the still image or moving image data in the recording medium 1120.

Also, the mobile phone 1600 is able to transmit a file containing a still image or moving image data captured in this way as an attachment of an e-mail. Specifically, when transmitting an e-mail, the user selects an image file stored in the nonvolatile memory 1080 or the recording medium 1120, and instructs transmission as an attachment.

The mobile phone 1600 is also able to transmit a file containing captured still image and moving image data to an external device such as PC and another phone with the external IF 1130. The user operates the operation unit 1100 to select an image file stored in the nonvolatile memory 1080 or the recording medium 1120, and instructs transmission. The control unit 1090 reads out the selected image file from the nonvolatile memory 1080 or the recording medium 1120, and controls the external IF 1130 to transmit the read image file to the external device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-163938 filed Aug. 11, 2014 and 2015-139109 filed Jul. 10, 2015, which are hereby incorporated by reference herein in their entirety.

What is claimed is:

1. An image capturing apparatus comprising:
    an imager which generates image data of are object and includes power supply control information into the image data;
    an image processor which performs predetermined image processing on the image data;
    a transmitter which transmits the image data from the imager to the image processor; and
    a controller which, based on the power supply control information, controls a power supply to the transmitter in a case where the transmitter transmits the image data, and controls a power supply to the image processor in a case where the image processor receives the image data.

2. The apparatus according to claim 1, wherein the power supply control information is included in each line of the image data.

3. The apparatus according to claim 1, wherein the power supply control information indicates one of a normal power supply state and a power saving state in which power consumption is less than in the normal power supply state.

4. The apparatus according to claim 3, wherein the power saving state is a state where power supply is not performed.

5. The apparatus according to claim 3, wherein the controller stores from the power saving state to the normal power supply state before the transmitter transmits image data of a next frame.

6. The apparatus according to claim 1,
    wherein the transmitter includes a plurality of transmission lines, and
    wherein the controller restricts power supply to at least one of the plurality of transmission lines of the transmitter.

7. The apparatus according to claim 6, wherein the controller controls power supply to the transmitter such that transmission is possible at all times over one of the plurality of transmission lines included in the transmitter.

8. The apparatus according to claim 1, wherein the imager includes an image sensor having a stacked structure.

9. A control method of an age capturing apparatus comprising:
    by an imager, generating image data of an object and including power supply control information into the image data;
    performing predetermined image processing on the image data by an image processor;
    transmitting the image data from the imager to the image processor; and
    controlling, based on the power supply control information, a power supply to the transmitter in a case where the transmitter transmits the image data, and a power supply to the image processor in a case where the image processor received the image data.

* * * * *